(12) United States Patent
Kim

(10) Patent No.: US 6,373,586 B1
(45) Date of Patent: Apr. 16, 2002

(54) IMAGE PRINTING SYSTEM AND PARTITIONED PRINTING METHOD THEREIN

(75) Inventor: Jong-san Kim, Yongin (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/158,524

(22) Filed: Sep. 22, 1998

(30) Foreign Application Priority Data

Dec. 27, 1997 (KR) .......................................... 97-74986

(51) Int. Cl.⁷ .............................................. G06K 15/02
(52) U.S. Cl. ...................................... 358/1.15; 358/1.13
(58) Field of Search ............................... 358/1.15, 1.13, 358/1.9, 1.17

(56) References Cited

U.S. PATENT DOCUMENTS

| | | | | |
|---|---|---|---|---|
| 5,778,253 A | * | 7/1998 | Blair et al. .................. | 395/888 |
| 5,815,187 A | * | 9/1998 | Ross, Jr. ..................... | 347/131 |
| 5,822,510 A | * | 10/1998 | LeClair et al. ............... | 395/116 |
| 5,892,587 A | * | 4/1999 | Okada et al. ................ | 358/402 |
| 6,134,017 A | * | 10/2000 | Schlank et al. ............. | 358/1.15 |

FOREIGN PATENT DOCUMENTS

| JP | 9-231027 | 9/1997 | ............. G06F/3/12 |
|---|---|---|---|
| JP | 10-143450 | 5/1998 | ........... G06F/13/00 |

* cited by examiner

*Primary Examiner*—Jerome Grant, II
*Assistant Examiner*—Douglas Tran
(74) *Attorney, Agent, or Firm*—Sughrue Mion, PLLC

(57) ABSTRACT

An image printing system, and a printing method according to the selection of either whole printing or partitioned printing, are provided. The image printing system includes a printer driver installed in a computer and a printer controller installed in a printer connected to the computer. The printer driver provides a print option menu on a screen of a display device to allow a user to select either whole printing or partitioned printing on a print object manuscript file to be printed, and outputs the selected result information to the printer together with a print data file transformed into a printer language with respect to the manuscript file. The printer controller reads data transmitted from the computer via a communications interface and determining a print sequence by a printer engine so that the total pages of a print data file selected to be printed by partitioned printing are divided and printed in segments at intervals of a set period in units of a determined number of pages. In the image printing system and the printing method according to the selection of partitioned printing, non-urgent print object files can be printed by partitioned printing. As a result, printer use time between users can be adjusted.

9 Claims, 9 Drawing Sheets

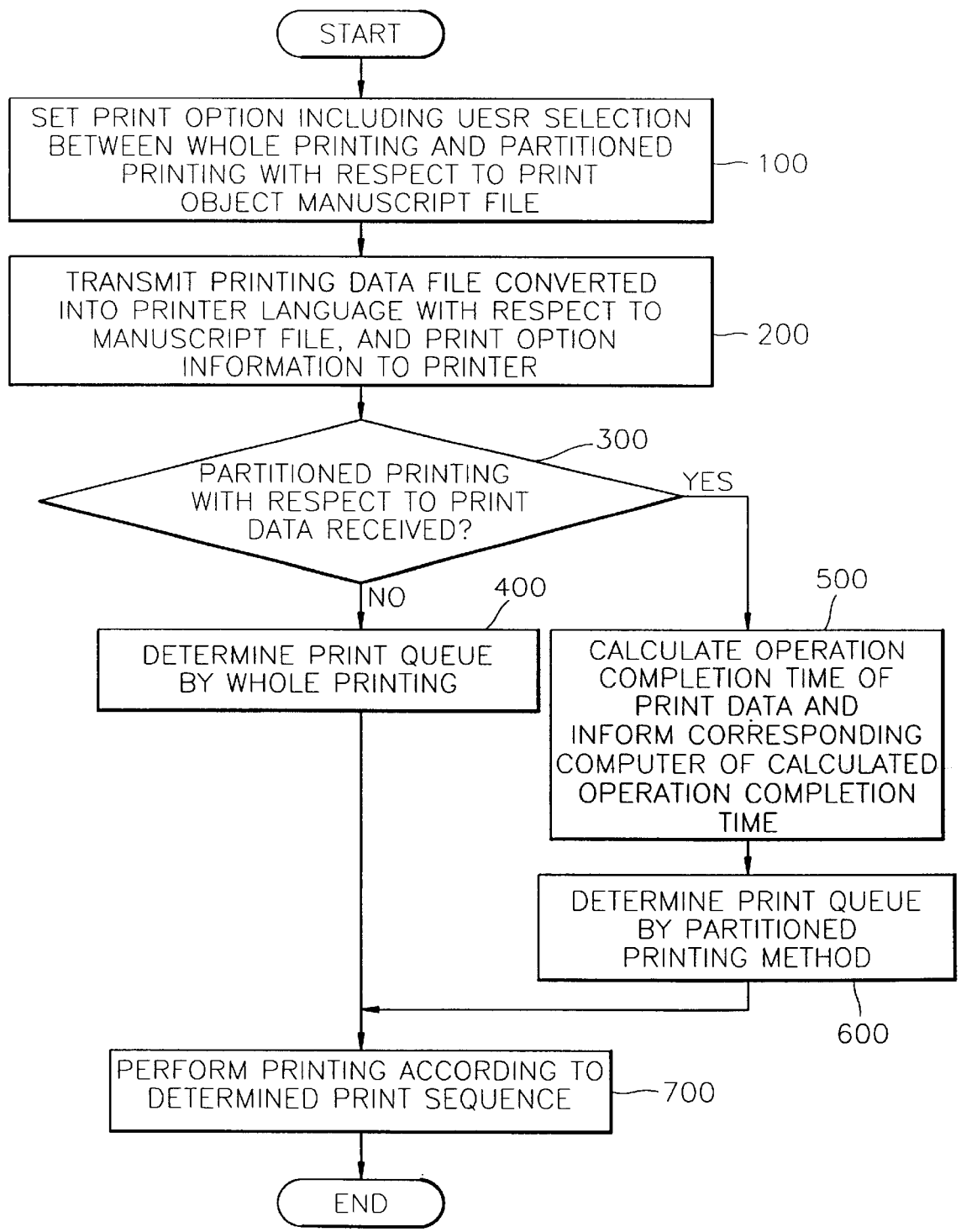

IMAGE PRINTING SYSTEM AND PARTITIONED PRINTING METHOD THEREIN

BACKGROUND OF THE INVENTION

1. Field of the Invention

The present invention relates to an image printing system and a partitioned printing method therein. More particularly, the present invention relates to an image printing system for controlling the print queue sequence according to the print speed selection with respect to a print object file, and a partitioned printing method therein.

2. Description of the Related Art

An image printing system includes a computer and a printer connected to the computer by a communications interface. The printer translates a print object manuscript file transformed into a print language and transmitted from the computer, and prints an image corresponding to the translated result on one or more supplied paper sheets.

The printer provides status information to a connected computer, as to whether a printing operation is possible or not. Typical status information includes a busy signal indicating that a data storage buffer is full of received data, a paper empty signal indicating that the main paper supply source is empty, an error signal indicating that a paper sheet is jammed during printing or that a printing operation can no longer be performed due to another critical problem. When printers are connected to a plurality of computers by a network, the printer generally provides information such as the file name, received time and size of queued print data stored in the buffer to a user computer requesting the information. Accordingly, the user can view a queued list obtained by communication with the printer, through a display device of the computer.

A conventional printer determines the print operation sequence using a first-in first-out method and performs printing by file according to the determined operation sequence. In the first-in first-out printing processing method of a printer, the printing sequence cannot be changed for a print data file transmitted from a user who wishes to perform an urgent printing operation. Thus, it is inconvenient for the user to use the printer.

There is a method for deleting all previously-received print data files corresponding to an impediment from the printer, in order to print a print data file which is required to be urgently printed. However, the print data files deleted from the printer cannot be restored, so users who sent the deleted print data files must again instruct the computer to transmit the desired files to the printer.

SUMMARY OF THE INVENTION

To solve the above problems, it is an objective of the present invention to provide an image printing system for controlling a print sequence with respect to a print data file received in accordance with a user's request, and a partitioned printing method therein.

Accordingly, to achieve the above objective, an image printing system is provided which includes a printer driver installed in a computer and printer controller installed in a printer corresponding to the computer. The printer driver, which is installed in the computer, provides a print option menu on a screen of a display device to allow a user to select either whole printing or partitioned printing on a print object manuscript file to be printed, and outputs the selected result information to the printer together with a print data file transformed into a printer language with respect to the manuscript file. The printer controller, which is installed in the printer, reads data transmitted from the computer via a communications interface and determines a print sequence by a printer engine so that the total pages of a print data file selected to be printed by partitioned printing are divided and printed in segments at intervals of a set period in units of a determined number of pages.

Preferably, the printer controller determines the print sequence by the printer engine to print a print data file selected to be printed by whole printing, during the period.

Also, to achieve the above objective, a partitioned printing method, for use in an image printing system including a computer and a printer connected to the computer by a communications interface, is provided. The method comprises the steps of:

(a) requesting a selecting of either whole printing or partitioned printing on a print object manuscript file on a print option selection menu screen using an input device of the computer when a request for printing is selected through the input device of the computer;

(b) Transmit information on the selected print option to the printer, together with a print data file obtained by transforming the manuscript file into a printer language; and (c) reading the print option information transmitted together with the print data file, and printing a print data file so that the total pages of a received print data file selected to be printed by partitioned printing are divided and printed in segments at intervals of a predetermined period in units of a predetermined number of pages.

It is preferable that in the printing step, a received print data file selected to be printed by whole printing is printed during the period.

BRIEF DESCRIPTION OF THE DRAWINGS

The above objective and advantage of the present invention will become more apparent by describing in detail a preferred embodiment thereof with reference to the attached drawings in which:

FIG. 5 is a flowchart for illustrating a partitioned printing method according to the present invention;

DESCRIPTION OF THE PREFERRED EMBODIMENT

Figure 1:
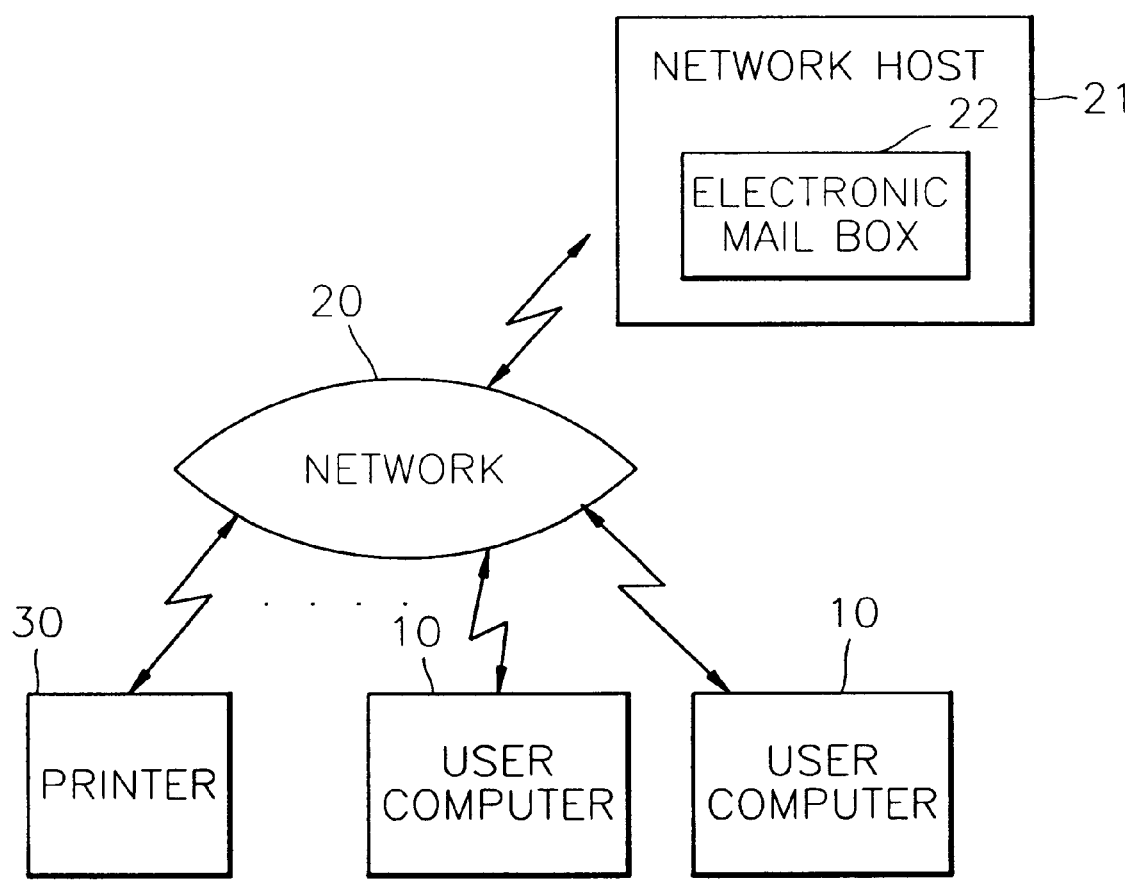
FIG. 1 is a block diagram illustrating an image printing system according to the present invention.

Referring to FIG. 1, a plurality of user computers 10 are connected to a printer 30 via a network 20 which is a communications interface. A network host 21 relays data between the printer 30 and the user computers 10. An electronic mailbox 22 installed in the network host 21 sends received electronic mail to a requested address.

Figure 2:
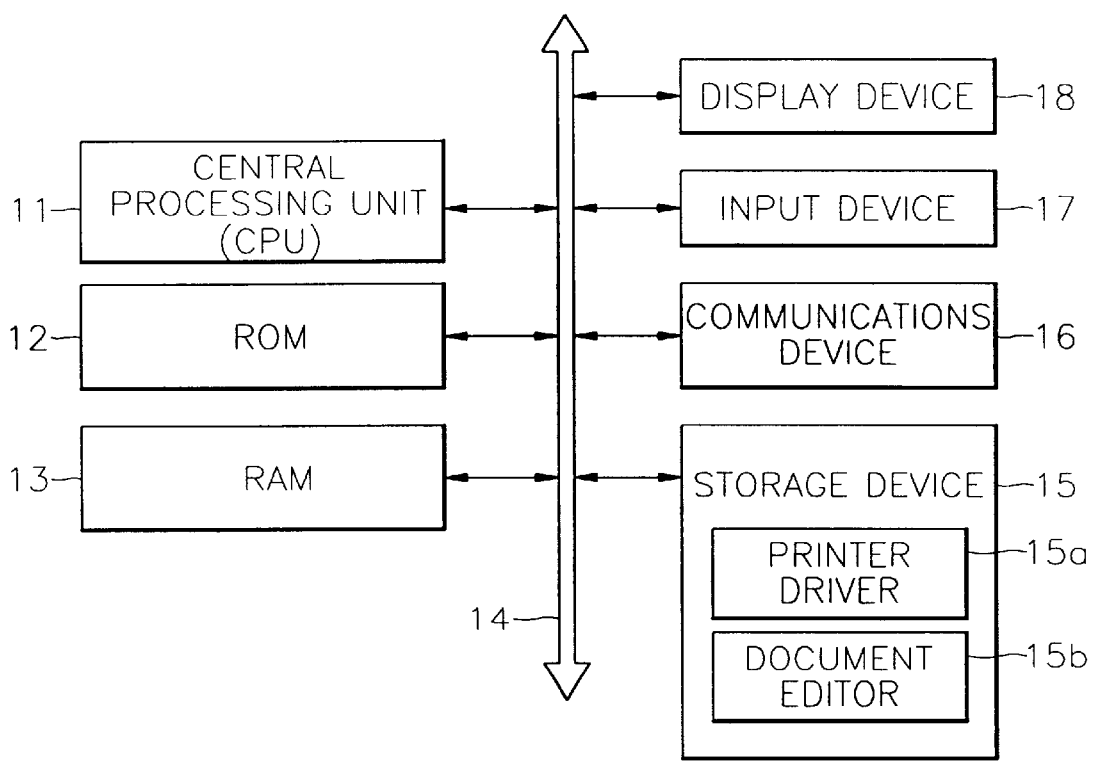
FIG. 2 is a block diagram illustrating the structure of the user computer of FIG. 1.

Each user computer 10, as shown in FIG. 2, has a CPU 11, a ROM 12, a RAM 13, a storage device 15, a communications device 16, an input device 17, and a display device 18 which are interconnected by a bus 14. The input device 17 may be a keyboard, a mouse, or other devices. A network card or a modem can be used as the communications device 16.

The storage device 15 stores a variety of application programs such as a printer driver 15*a* and a document editor 15*b*.

The printer driver 15*a* provided in the storage device 15 provides a print option menu via a screen of the display device 18 to allow a user to select either whole printing or partitioned printing with respect to a print object manuscript file, makes a print data file by transforming a manuscript file into a print language, and transmits the print data file, including selected print option information, to a printer.

Figure 4:
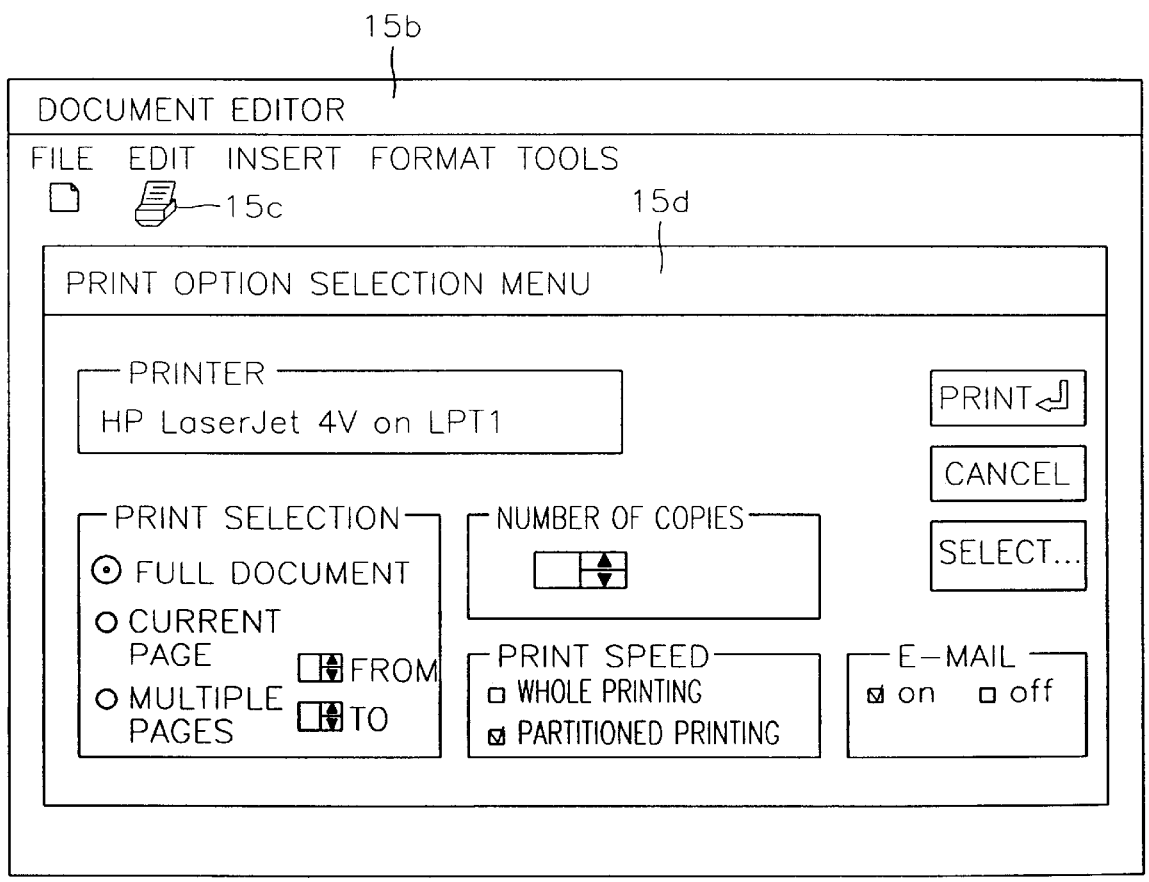
FIG. 4 illustrates an example of a print option selection menu displayed on a screen of a user computer display device of FIG. 2.

FIG. 4 shows an example of a print option selection menu 15*d* supplied by the printer driver 15*a* via a screen of the display device 18. Referring to FIG. 4, a selection item such as the print selection, the number of copies, the print speed, and E-mail with respect to a print object manuscript file, are displayed on the screen. In particular, the print speed (either "whole printing" or "partitioned printing") must be selected. Print option information selected by a user via the input device 17 on a print option selection menu 15*d* provided on the screen is transmitted to the printer 30 together with the print data file transformed into the print language.

Figure 3:
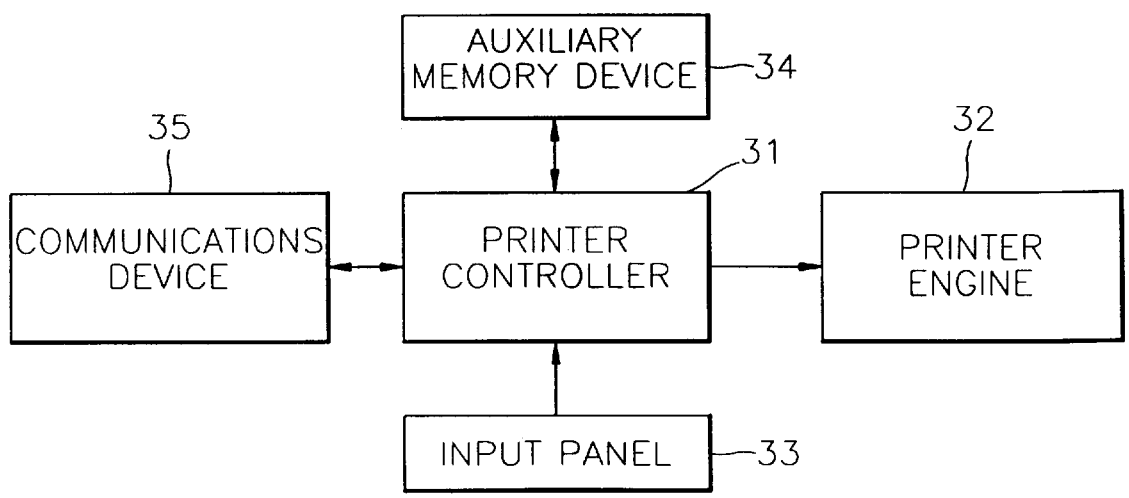
FIG. 3 is a block diagram illustrating the structure of the printer of FIG. 1.

Meanwhile, as shown in FIG. 3, the printer 30, which is connected to the computers 10 via the network 20 for performing a printing operation corresponding to received print data, includes a printer controller 31, a printer engine 32, an input panel 33, an auxiliary memory device 34, and a communications device 35 such as a network card.

The printer controller 31 reads data transmitted from the computer 10 via the communications interface 20 and controls the printing operation of the printer engine 32 on demand. For a print data file to be printed in segments, the printer controller 31 controls the sequence of printing by the printer engine 32 to perform intermittent partitioned printing at predetermined intervals for predetermined sheets of pages. For a print data file to be collectively printed, the printer controller 31 controls the sequence of printing by the printer engine 32 to perform a whole printing operation during the period between partitioned printing operations.

In the case of a color printer (not shown), the printer engine 32 has an optical scanning apparatus for scanning light, corresponding to image data into which printing data is converted in accordance with the driving of the engine, on a photosensitive medium, a developer for developing an electrostatic latent image formed on the photosensitive medium with a developing material, a transcriber for transcribing an image formed of a developing material on the photosensitive medium to a supplied paper sheet, and a paper discharger for discharging the paper, on which an image is transcribed, to an designated paper discharge box.

Preferably, a plurality of paper discharge boxes, that are different from each other in a paper discharging path, are provided to prevent printed matter, produced by the request for partitioned printing, from being mixed with printed matter produced by the request for whole printing. The paper discharger is controlled so that the printed matter produced by the partitioned printing request and that produced by the whole printing request can be respectively discharged to different paper discharge boxes via different paths. Here, the printed matter denotes a paper on which an image is printed via the transcriber.

A plurality of input keys for selecting various printing functions provided by the printer 30 are provided in the input panel 33 generally installed on the outer surface of a main body. A key input signal corresponding to manipulation of input keys is transmitted to the printer controller 31.

The auxiliary memory device 34 stores the print data file received under the control of the printer controller 31 and image data converted for use by the printer engine 32.

A printing method by the image printing system will now be described referring to the flowcharts of FIG. 5 and FIGS. 6A through 6D.

First, a user sets a print option via a print option selection menu 15*d* (see FIG. 4) provided by the printer driver 15*a* installed in the computer 10, in step 100. Such a print option setting process will now be described in more detail, referring to FIG. 6A and the print option selection menu of FIG. 4. A user clicks a printing request icon 15*c* of FIG. 4, provided by the document editor 15*b* of the computer 10, using a mouse or keyboard, and a print option setting request (see step 110 of FIG. 6A) is thus transmitted. If the print option setting request is selected, the print option selection menu 15*d* is supplied by the printer driver 15*a* via a screen of the display device 18. The user selects a print option using the input device 17 while viewing the provided print option selection menu 15*d*. The information selected by the user is stored in a memory location set for use to record the print option.

When the E-mail option among the items on the print option menu 15*d* is selected as "on", the E-mail address is received and recorded. Also, when partitioned printing is selected on the print speed item, partitioned printing request information is recorded. Otherwise, whole printing request information is recorded. In addition, information selected with respect to other parameters such as the print selection and the number of copies is recorded, in step 170 of FIG. 6A. When a "print" button on the screen is selected, determination of the print option is completed, in step 180 of FIG. 6A. After determination of the print option is required in step 110 of FIG. 6A, if the print option set as a default value is consistent with an item intended to be selected by the user, the procedure returns to the step 180.

If the print option selection is completed, the printer driver 15*a* produces a print data file with respect to a print object manuscript file stored in the storage device 15 according to the transform system of the selected printer language (e.g., post script, print control language (PCL), etc.). Then, the selected print option information together with the print data file is transmitted to the printer 30, in step 200 in FIG. 5. Such a process will be described referring to FIG. 6B.

Figure 6A:
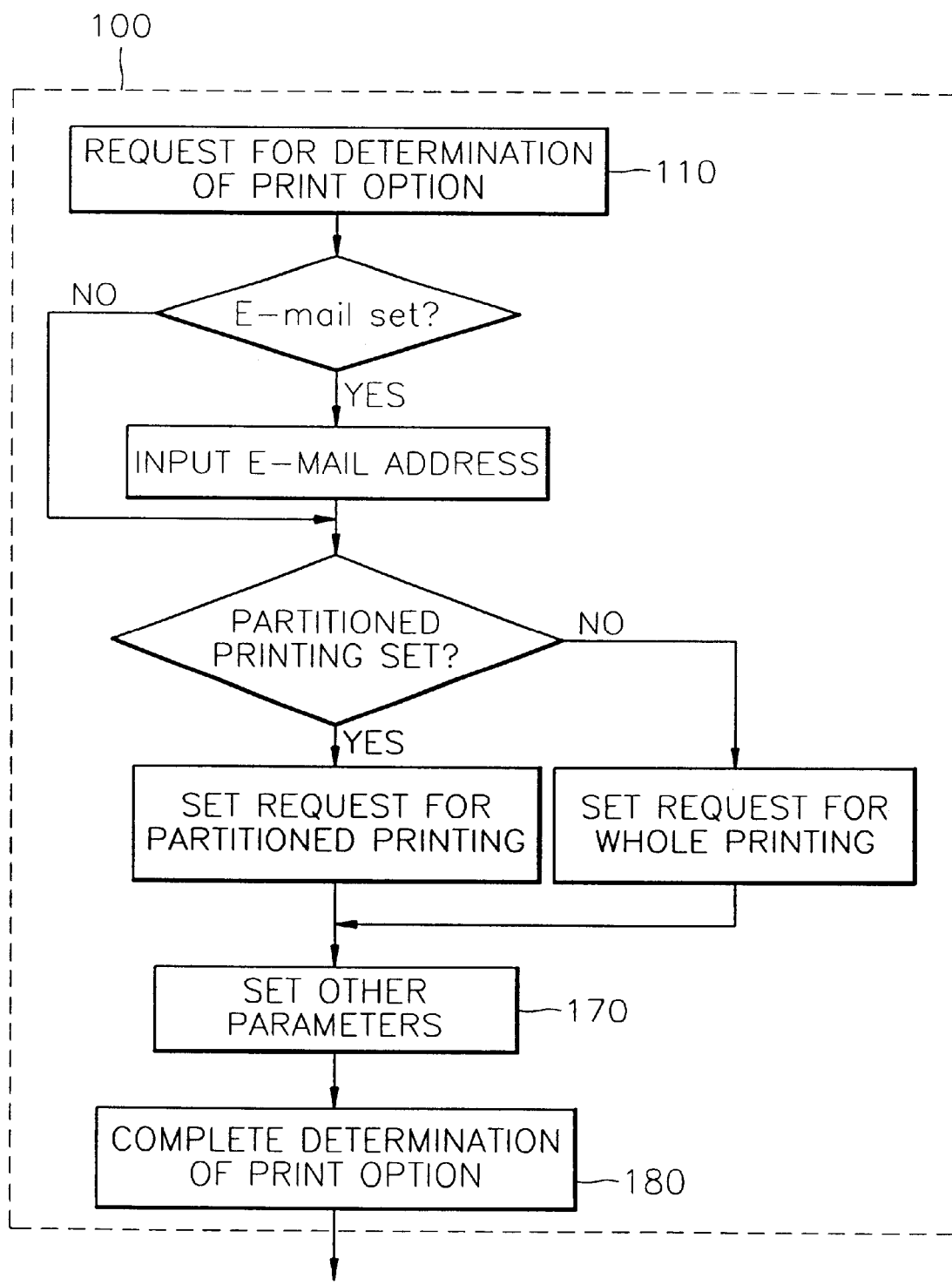
FIGS. 6A through 6D are flowcharts illustrating the detailed process of each step of FIG. 5.
Figure 6B:
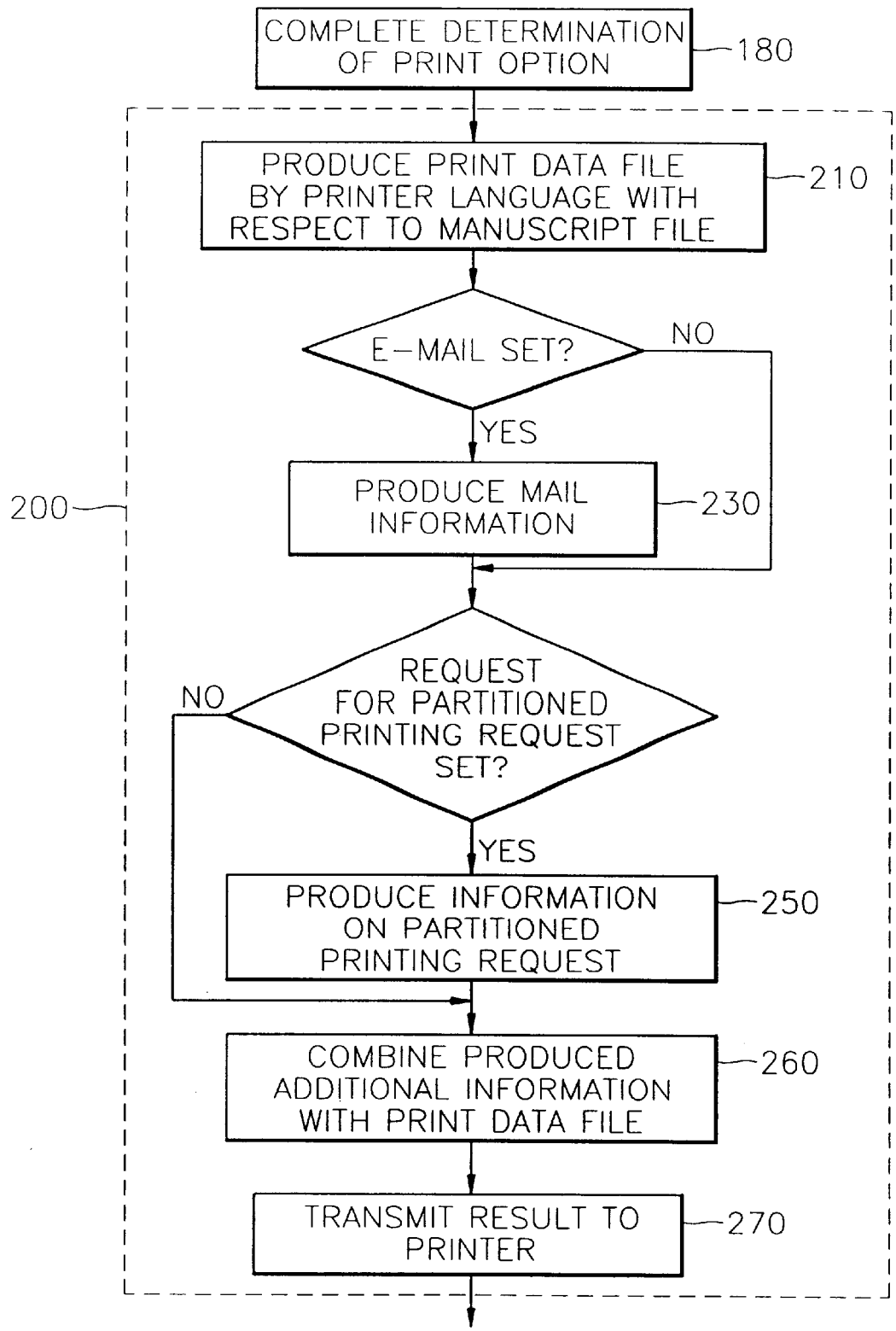

In FIG. 6B, a print data file for use by a printer is produced from a manuscript file, in step 210. Then, the selected print option information is read, and if the E-mail selection is set to "on", necessary information such as the mail address of a computer 10 is produced, in step 230. When the partitioned printing request is set, information on partitioned printing is produced, in step 250. Then, information produced in association with the print option is combined with the print data file in step 260. The result is transmitted to the printer 30 in step 270.

The printer controller 31 determines whether partitioned printing is requested, by reading transmitted information from the received printing data file, in step 300 of FIG. 5.

Figure 6C:
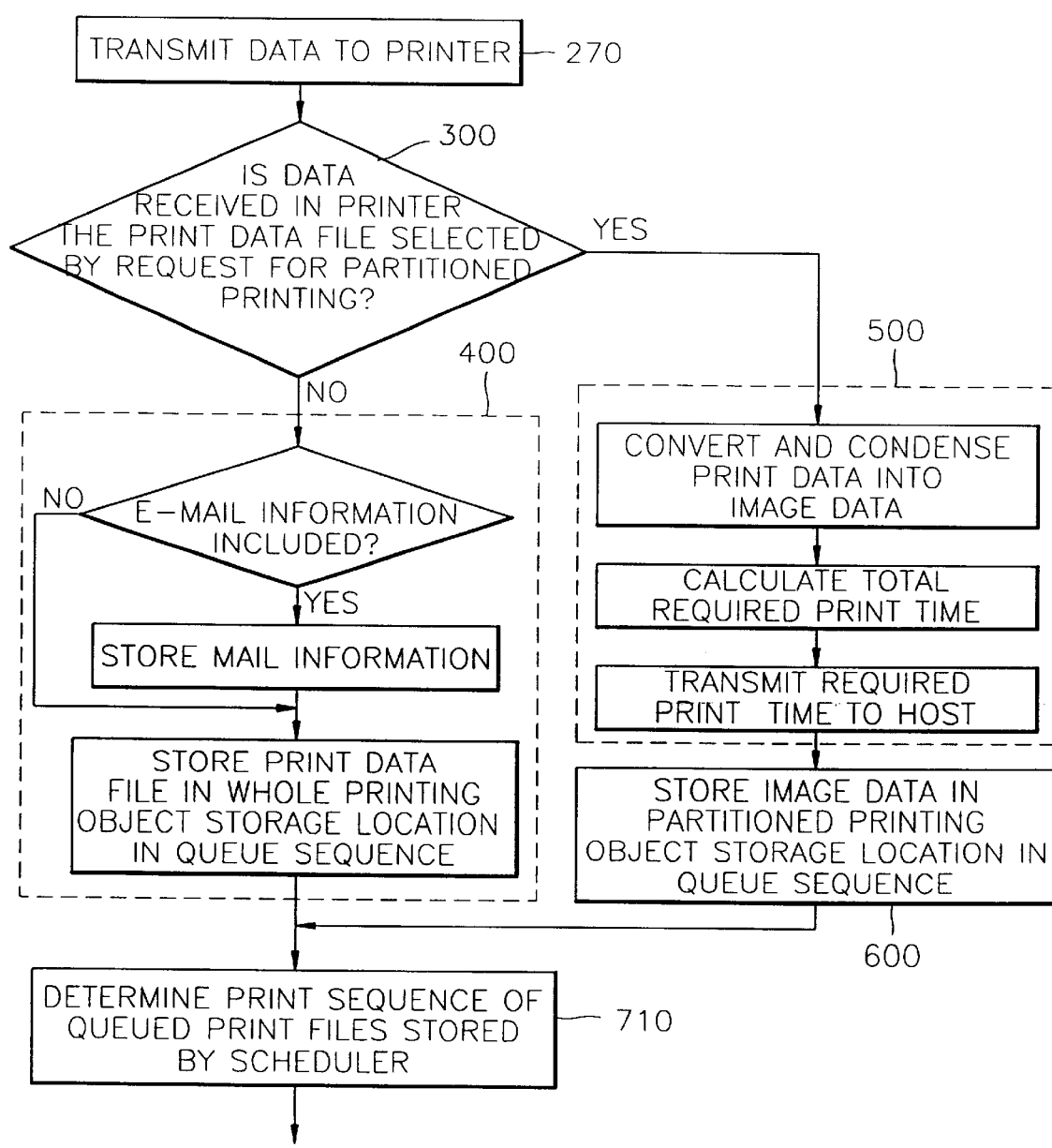

Referring to FIG. 6C, a print data file to be printed by whole printing is stored together with mail information in a whole printing object storage location, in step 400. Here, the print sequence among print data files stored in the whole printing object storage location is determined according to the received sequence.

In contrast, for the print data file required to be printed by partitioned printing, the total time required to complete the printing operation is calculated, and the calculated total required time or information on expected printing completion time calculated from the total time required is transmitted to a computer 10 which sent the print data file, in step 500. According to the process for calculating the total required time, the print data file is converted into image data for the printer engine 32. The total number of pages to be printed is calculated from the image data. When one page at a time is set to be printed, the total time required is obtained by adding the product of the time required to print one page by the total number of pages, to the product of the result obtained by subtracting 1 from the total number of pages by the period.

The required printing time calculated in this way is transmitted to the computer 10 which sends the print data file via the network 20. The image data converted for use of the printer engine 32 is stored in a partitioned printing object storage location (see FIG. 7) allocated in the auxiliary memory device 34, in step 600. The print order among the print data files stored in the partitioned object storage location is determined according to the order received.

Figure 6D:
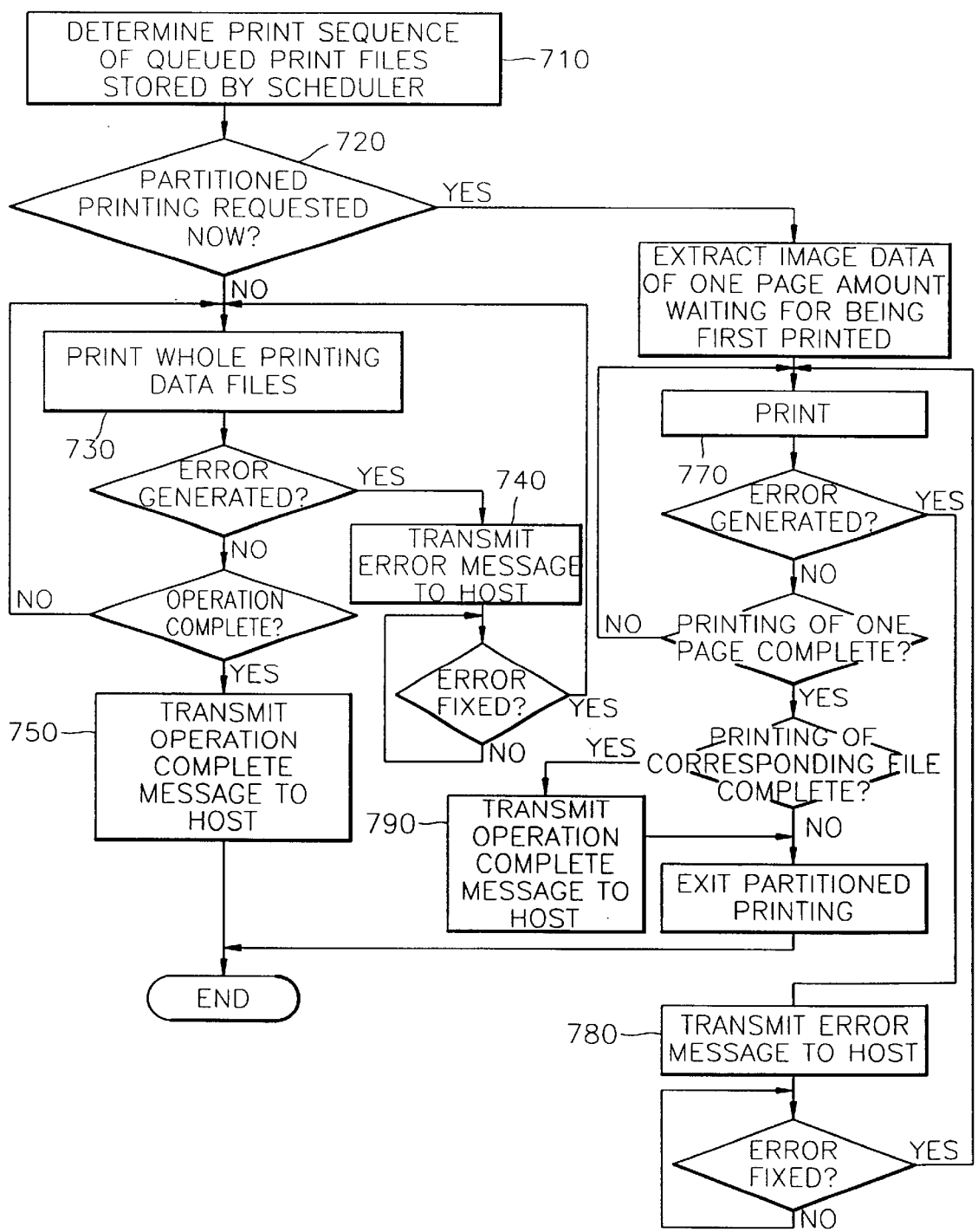

Thereafter, printing is performed according to the print sequence between print data files determined by the scheduler of the printer controller 31, in step 700. The determination of the print sequence and the printing operation according to the determined operation sequence will now be described in more detail referring to FIG. 6D. Referring to FIG. 6D, in step 710, the print sequence by the printer engine is determined so that for received print data files selected to be printed by partitioned printing, the predetermined number of pages among the partitioned printing object print data files can be intermittently printed at predetermined intervals. Between intervals, the print sequence is determined so that received print data files selected to be printed by whole printing can be printed. The time required to print the predetermined number of pages of the partitioned printing object between the determined intervals, and the interval are appropriately selected.

Figure 7:
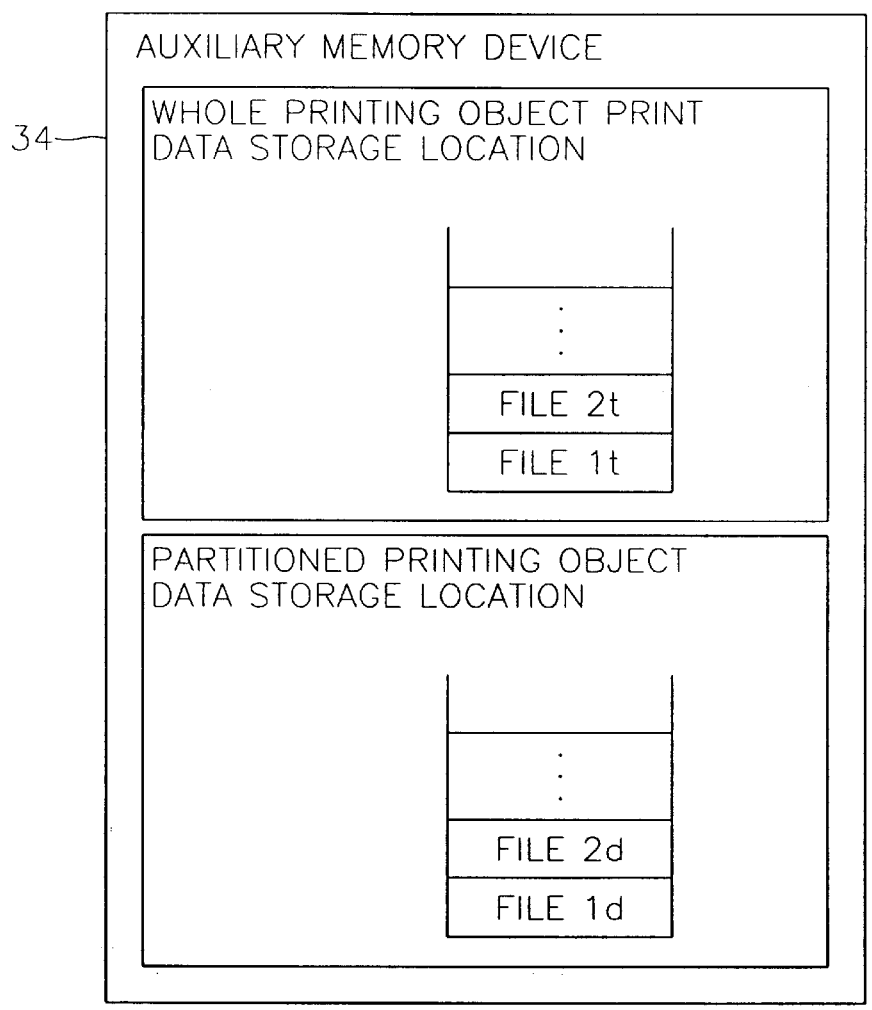
FIG. 7 illustrates print data files classified and stored in an auxiliary storage device of a printer for explaining an example of a method of determining the sequence of printing data files input to the printer.
Figure 8:
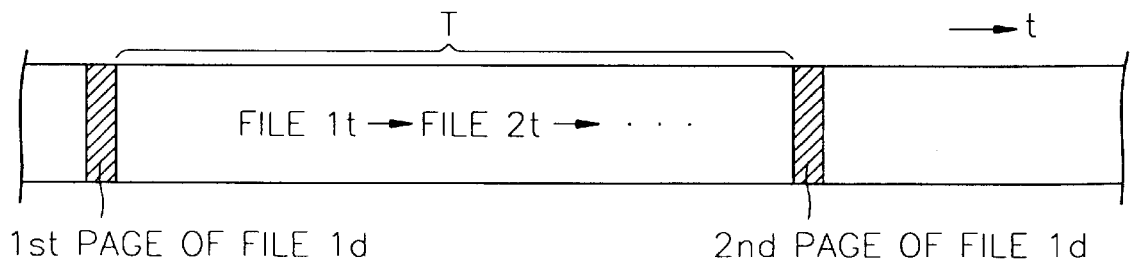
FIG. 8 is an operation performance timing diagram illustrating printing according to a method of determining the sequence of printing data files input to a printer.

As an example, the whole printing object print data and the partitioned printing object print data are separated and stored according the sequence received in the auxiliary memory device 34 as shown in FIG. 7. For the partitioned printing object files, a predetermined quantity, e.g., one page, of a previously-received file, i.e., a file 1d, is printed by the printer engine at intervals of a predetermined period (T). For the whole printing object files, the printing sequence is determined so that files 1t and 2t can be sequentially processed according to the sequence received, i.e., by a first-in first-out method, during the period (T), as shown in FIG. 8, in step 710 of FIG. 6C.

Meanwhile, in this print sequence determination method, when the partitioned printing object print data file is received, the print sequence can be determined so that the current printing operation on the whole printing object print data files is appropriately stopped, and, immediately, the partitioned printing object print data file can be printed. Alternatively, the whole printing object print data files received prior to the partitioned printing object print data file are all processed, and then the partitioned printing object print data file can be printed.

According to such a print sequence determination method, it is determined whether a partitioned printing operation is requested, in step 720. The scheduler determines the time by the determined period interval, and if the partitioned printing object data remains in the auxiliary memory device, it is determined that the partitioned printing is required to be performed, in step 720.

If the partitioned printing operation is not requested at this time, a print data file of the first order determined according to the receiving sequence and print data files of the following order, among the print data files stored in the whole printing object storage location, are sequentially and continuously printed during the set period, in step 730. Here, when the total pages of the whole printing object print data files are not all printed during the period, a partitioned printing object page of the next order is printed, and the remaining unprocessed pages are printed during a subsequent period.

For a print data file on which operation errors occur during printing or printing is completed, an error generation or print completion message is transmitted to a corresponding computer, in steps 740 and 750.

If it is determined in step 720 that the partitioned printing operation was requested to be currently performed, image data of one page quantity of a print data file to be printed first with respect to the print data files stored in the partitioned printing object storage location is printed by the printer engine, in step 770. In this step, when print errors are generated or a printing operation of file units is completed, an error or completion message is transmitted to the corresponding computer, in steps 780 and 790.

As described above, in the image printing system and the whole or partitioned printing method according to the present invention, non-urgent print object files can be printed by partitioned printing. Thus, printer use time between users can be adjusted.

Although the present invention has been described herein in terms of a preferred embodiment, it will be understood by those of skill in the art that various changes and modifications may be made to the described embodiment without departing from the spirit and scope of the claimed invention.

This application is based on Korean Patent Application No. 97-74986, which is incorporated by reference herein for all purposes.

What is claimed is:

1. An image printing system comprising:
   a printer driver installed in a computer, for providing a print option menu on a screen of a display device to allow a user to select either whole printing or partitioned printing on a print object manuscript file to be printed, and outputting the selected result information to a printer, connected to said computer, together with a print data file transformed into a printer language with respect to the manuscript file; and
   a printer controller installed in said printer, for reading data transmitted from the computer via a communications interface and determining a print sequence by a printer engine so that the total pages of a print data file selected to be printed by partitioned printing are divided and printed in segments at intervals of a set period in units of a determined number of pages.

2. The image printing system as claimed in claim 1, wherein the printer controller determines the print sequence by the printer engine to print a print data file selected to be printed by whole printing, during the set period.

3. The image printing system as claimed in claim 1, wherein the printer controller calculates the expected printing completion time with respect to a print data file selected to be printed by partitioned printing and transmits the calculated printing completion time information to the computer which sent the print data file.

4. The image printing system as claimed in claim 1, wherein the communications interface is a network for relaying information exchange between a plurality of computers and at least one printer.

5. A partitioned printing method for use in an image printing system which includes a computer and a printer connected to the computer by a communications interface, the printing method comprising the steps of:

requesting a selection of either whole printing or partitioned printing on a print object manuscript file on a print option selection menu screen using an input device of the computer when a request for printing is selected through the input device of the computer;

transmitting information on the selected print option to the printer, together with a print data file obtained by transforming the manuscript file into a printer language;

reading the print option information transmitted together with the print data file; and printing a print data file so that the total pages of a received print data file selected to be printed by partitioned printing are divided and printed in segments at intervals of a predetermined period in units of a predetermined number of pages.

6. The partitioned printing method in an image printing system as claimed in claim 5, wherein in the printing step, a received print data file selected to be printed by whole printing is printed during the period.

7. The partitioned printing method in an image printing system as claimed in claim 5, wherein the printing step further comprises a process for calculating the expected printing completion time with respect to the received print data file selected to be printed by partitioned printing and informing the computer which sent the print data file of the calculated printing completion time information.

8. The partitioned printing method in an image printing system as claimed in claim 6, wherein in the printing step, paper sheets on which printing is performed by a printer engine at the period intervals upon the request for partitioned printing are discharged in a different path from a path along which paper sheets on which whole printing is performed are discharged, to prevent the paper sheets printed by partitioned printing from mixing with the paper sheets printed by whole printing.

9. A computer program, embodied on one or more computer-readable media, for controlling an image printing system which includes a computer and a printer connected to the computer by a communications interface, comprising:

a requesting code segment for requesting from a user a selection of either whole printing or partitioned printing on a print object manuscript file on a print option selection menu screen using an input device of the computer when a request for printing is selected through the input device of the computer;

a transmitting code segment for transmitting information on the selected print option to the printer, together with a print data file obtained by transforming the manuscript file into a printer language;

a reading code segment for reading the print option information transmitted together with the print data file; and a printing code segment for printing a print data file so that the total pages of a received print data file selected to be printed by partitioned printing are divided and printed in segments at intervals of a predetermined period in units of a predetermined number of pages.

\* \* \* \* \*